No. 818,845. PATENTED APR. 24, 1906.
E. NELSON.
TRANSMISSION MECHANISM.
APPLICATION FILED JULY 19, 1905.
2 SHEETS—SHEET 1.
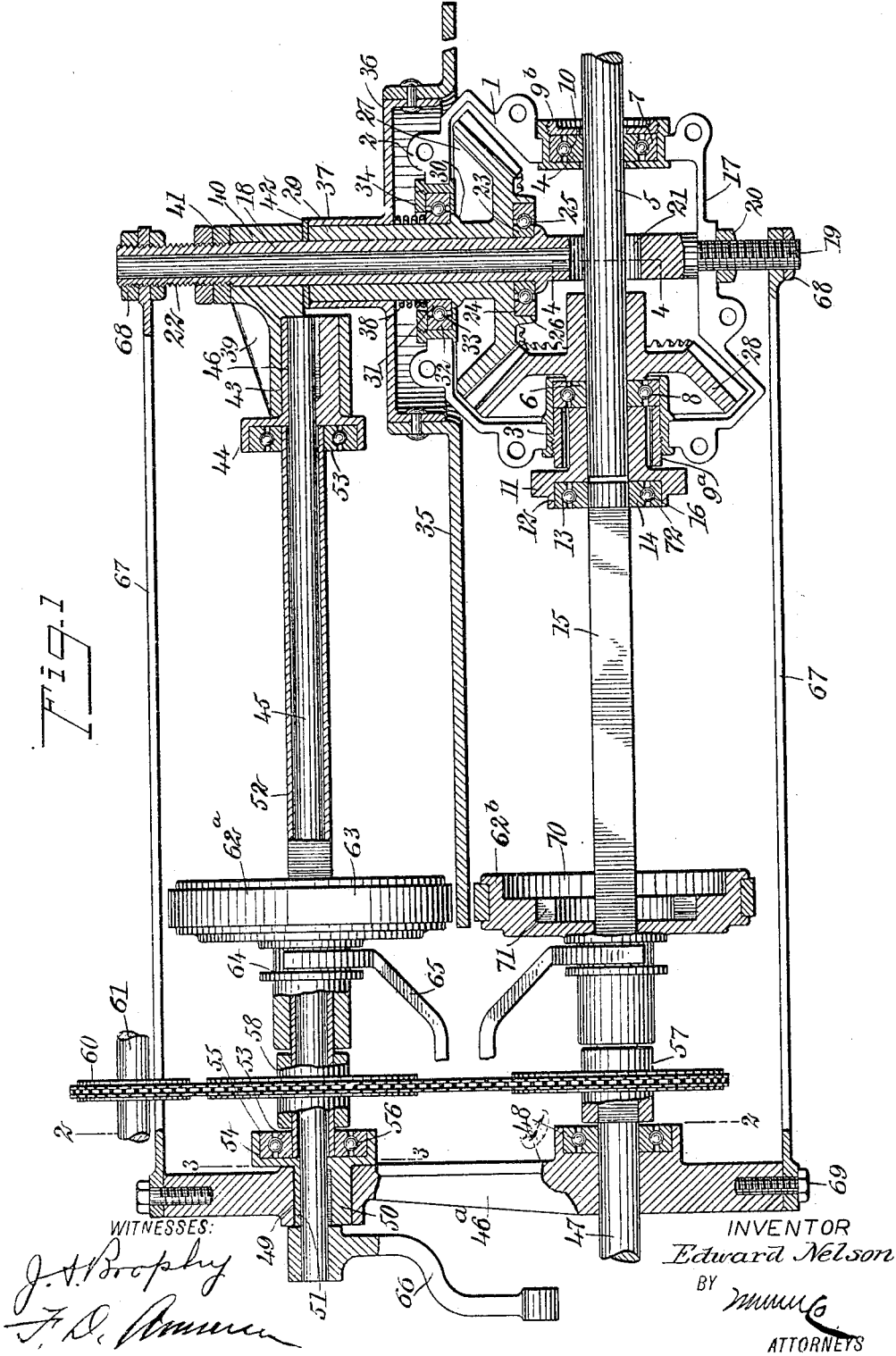
INVENTOR
Edward Nelson

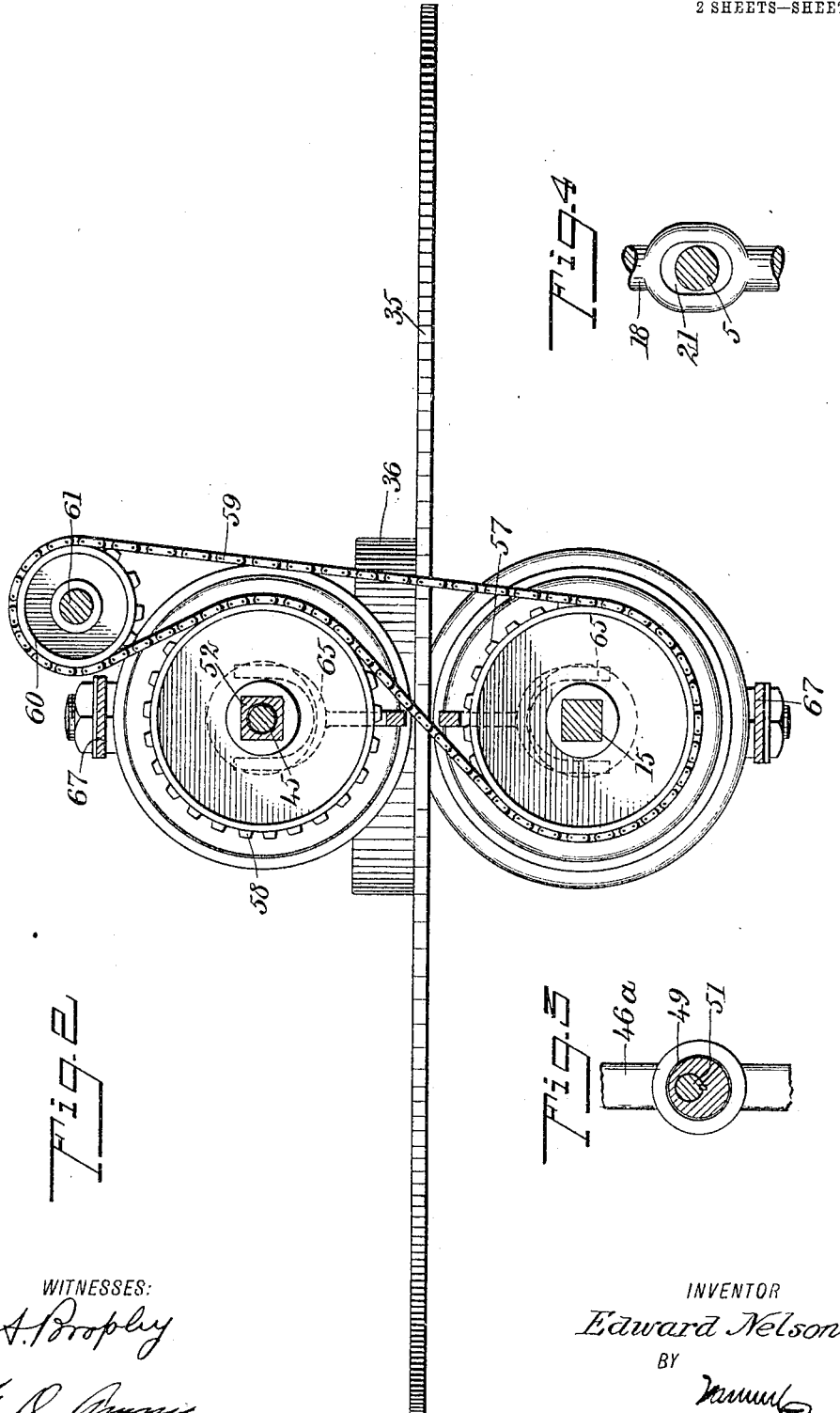

UNITED STATES PATENT OFFICE.

EDWARD NELSON, OF NEW YORK, N. Y.

TRANSMISSION MECHANISM.

No. 818,845.　　　Specification of Letters Patent.　　　Patented April 24, 1906.

Application filed July 19, 1905. Serial No. 270,406.

*To all whom it may concern:*

Be it known that I, EDWARD NELSON, a citizen of the United States, and a resident of the city of New York, borough of Brooklyn, in the county of Kings and State of New York, have invented a new and Improved Transmission Mechanism, of which the following is a full, clear, and exact description.

This invention relates to transmission mechanism, and it is especially useful under circumstances where it is desirable to transmit power at a variable velocity of rotation.

The object of the invention is to produce a mechanism of this class which will be simple in construction and which will enable a variable-speed transmission to be effected by frictional contact, and to further provide means whereby the transmission may become positive.

The invention seems to be most applicable in connection with the driving of vehicles of all kinds.

The invention consists in the construction and combination of parts to be more fully described hereinafter, and definitely set forth in the claims.

Reference is to be had to the accompanying drawings, forming a part of this specification, in which similar characters of reference indicate corresponding parts in all the figures.

Figure 1 is substantially a central section through the mechanism, certain parts being shown in elevation and others being represented as broken away. Fig. 2 is a cross-section taken on the line 2 2 of Fig. 1. Fig. 3 is a cross-section taken on the line 3 3 of Fig. 1 and illustrating a detail of the construction for mounting the starting-spindle, and Fig. 4 is a cross-section on the line 4 4 of Fig. 1.

Referring more particularly to the parts, 1 represents a casing or gear-case, which is preferably formed in sections in a common manner, one of said sections being provided with laterally-projecting ears to enable the same to be bolted together in the usual manner. In opposite walls of the gear-case bearings 3 and 4 are provided, in which there is mounted a horizontal driven shaft 5. I prefer to use ball-bearings at this point, and for this purpose I attach collars 6 to the driven shaft 5. About these collars are disposed concentric rings 7, and these rings and collars are provided with grooves which constitute ball-races 8. Followers or ball-retainers 9ª and 9ᵇ hold these parts in position, as indicated. Balls 10 are placed in the ball-races, and from this arrangement the friction is much reduced. The ball-retainer 9ª has the form of a sleeve which is externally threaded, so as to enable the same to be attached in the bearing, as indicated. The extremity of the shaft 5 extends beyond the collar 6 and carries rigidly a clutch member 11, the purpose of which will be described more fully hereinafter. The face of this clutch member forms a recess 12, in which a ring 13 is set, the said ring surrounding a collar 14, which is carried rigidly by a speed-shaft 15. The adjacent faces of the collar 14 and ring 13 are grooved, so as to form a raceway for balls 16. In this way the shaft 15 is coupled loosely to the driven shaft 5.

In the lower wall 17 of the gear-case 1 there is rigidly attached a spindle 18, the said spindle having a reduced threaded extremity 19, secured in position by a nut 20, as indicated. Adjacent to the shaft 5 the spindle 18 is formed with an enlarged eye 21, as indicated in Fig. 4, through which the shaft 5 passes loosely. Beyond this eye 21 the upper portion of the spindle 18 is preferably made tubular, as indicated in Fig. 1, and formed with a threaded extremity 22. Adjacent to the eye 21 the spindle 18 is formed with a laterally-projecting shoulder, which constitutes a seat for a collar 23. This collar is surrounded by a concentric ball-ring 24, and between the collar and ring balls 25 are supported in the raceway, as indicated. This ring 24 is rigidly secured in a recess 26, formed in the face of a bevel gear-wheel 27, mounted within the gear-case 1, as indicated. This bevel gear-wheel 27 meshes with a bevel-gear 28, which is rigidly attached to the driven shaft 5 and also lies within the gear-case 1.

The bevel gear-wheel 27 is formed with an elongated hub 29, and this bevel-gear is loosely mounted to rotate upon the spindle 18, as will be readily understood. At a point near the body of the bevel gear-wheel 27 the hub 29 thereof is provided with a laterally-projecting shoulder 30, which constitutes a seat for a collar 31. This collar is surrounded by a ball-ring 32, and balls 33 run between the collar and ring, as shown. A follower 34 makes threaded engagement with the bearing at this point, as indicated, so as to retain the parts in position in a well-understood manner. Above the collar 31 the hub 29 is made of angular cross-section, and it is preferably of square form. Upon the square hub 29 of the bevel gear-wheel 27 a friction-disk 35 is mounted to slide. This disk comprises a body which is attached to a hub 36, the said hub having an elongated sleeve 37 integral therewith, which fits closely upon the hub 29, as indicated. A helical spring 38 is disposed around the hub 29 and thrusts against the face of the hub 36 of the disk and normally maintains the same in a slightly-elevated position. The lower extremity of the spring 38 rests against the collar 31 aforesaid.

Near the extremity of the spindle 18 a bracket 39 is attached, the same having a bore 40, which receives the spindle, as indicated. Nuts 41 are provided on the threaded extremity 22 of the spindle, which afford means for holding the bracket 39 in position. Between the face of the bracket and the hub 29 a washer 42, of suitable material, is placed, as shown. The bracket 39 projects to one side, so that it constitutes a rudimentary arm. It is formed with a bore 43, the axis whereof is disposed at right angles to the spindle 18, and in this bore there is rotatably mounted a bushing or bush 44. This bushing is rigidly attached to a starting-spindle 45, which is disposed horizontally and the extremity whereof is received in an eccentrically-placed opening 46.

At a suitable distance from the spindle 18 I provide a bracket or arm $46^a$. This bracket affords means for supporting the aforesaid speed-shaft 15 and the starting-spindle 45, just referred to. The speed-shaft 15 for this purpose is formed with a round body 47, which is rotatably mounted at a suitable ball-bearing 48, formed in the bracket $46^a$, as indicated. Opposite the bore 43 of the bracket 39 a similar opening or bore 49 is formed in the bracket $46^a$, and in this opening there is mounted a bushing or bush 50. This bush 50 is formed with an opening 51, which receives the aforesaid starting-spindle 45, and this opening is eccentrically placed like the corresponding opening 46 in the bush 44. The starting-spindle is rigidly attached to the bushes 44 and 50. Upon the starting-spindle 45 there is loosely mounted an angular shaft 52, which is preferably of square cross-section, as shown. This shaft is simply a hollow shaft carrying rigid collars 53 at its extremities. The adjacent extremities of the bushes 44 and 50 are so expanded as to form heads, and the faces of these heads are formed with recesses 54. In these recesses collars 53 lie, and opposite these collars ball-rings 55 are placed. Between the collars and the rings balls 56 are carried in ball-races, as indicated. In this way a substantially frictionless connection is made between the starting-spindle and the speed-shaft 52.

The shaft 47 constitutes the main shaft from which the power is received and transmitted. It should be understood that the speed-shaft 15 constitutes an integral extension of the shaft 47. In order to drive the speed-shaft 52 from the main shaft 47, I provide sprocket-wheels 57 58, which are rigid, respectively, with the said shafts, and over these sprocket-wheels a chain 59 passes. In order that this chain 59 may drive the shaft 52 in a reverse direction to the shaft 47, the chain 59 passes over an auxiliary sprocket-wheel 60, carried by a counter-shaft 61, as indicated most clearly in Fig. 2.

Slidably mounted on each of the speed-shafts 15 and 52 are friction-rollers $62^a$ and $62^b$. These rollers are disposed normally opposite to each other and their faces lie adjacent to the faces of the friction-disk 35. The face of each roller is preferably encircled by a band 63, of suitable material—such as paper, leather, or rubber—which would be adapted to increase the frictional engagement between the rollers and the disk. For the purpose of enabling the rollers $62^a$ and $62^b$ to be slid along the shafts they are provided with elongated hubs, and the said hubs are formed with collars 64, facilitating the application of shifting yokes 65. Upon the extremity of the starting-spindle 45, which projects beyond the bracket $46^a$, a starting-lever 66 is rigidly attached. When this lever is rotated, it of course rotates the spindle 45 and the eccentric bushes 44 and 50. In this way the axis of the speed-shaft 52 may be made to approach the axis of the speed-shaft 15. If this movement is sufficient, the friction-rollers $62^a$ $62^b$ will be brought toward each other in such manner as to clamp the body of the disk 35 between their faces, as will be readily understood.

I connect the bracket $46^a$ with the spindle 18 by means of links or distance-rods 67. These rods are preferably formed with eyes at the extremities adjacent to the spindle, through which the spindle passes, nuts 68 being used for securing the links in position at this point. The opposite extremities of the links are attached to the bracket $46^a$ by means of suitable bolts 69.

While I prefer to use square speed-shafts 15 and 52, it should be understood that the main object in the construction of these parts is simply to prevent the rotation of the rollers $62^a$ and $62^b$ without a corresponding rotation of the shaft.

In practice a construction often used for this purpose is a longitudinal slot or key-seat formed in the shaft, in which key-seat a feather or spline runs, which is attached to the movable member. These matters are of course matters of design and may be changed to suit particular circumstances.

The construction of the roller $62^b$ is shown clearly in Fig. 1. Its inner face is formed with an enlarged recess 70 and a similar recess 71. The recess 71 is adapted to coöperate with the outer face 72 of the collar 11, so as to constitute a clutch, it being understood that these members would be formed so as to interlock in a well-known manner. From this arrangement when the roller 62$^b$ travels sufficiently in the direction of the gear-case these parts will interlock, and a positive connection will then be made through the roller 62$^b$ to the shaft 5.

The mode of operation of the mechanism will now be described. Supposing that the parts occupy substantially the position shown in Fig. 1 and the mechanism is to be started, the lever 66 will be turned, so as to move the speed-shaft 52 toward the speed-shaft 15 and so as to clamp the edge of the disk 35 between the rollers 62$^a$ and 62$^b$. It being understood that the shaft 47 is continually driven, this operation will have the effect of rotating the disk 35. The rotation of this disk is transmitted through the square hub 29 to the bevel gear-wheel 27. This bevel-gear will of course drive the bevel-gear 28, and rotation in this way is transmitted to the driven shaft 5. If it is desired to increase the speed of rotation of the shaft 5, the shifting yokes 65 will then be moved, so as to advance the rollers 62$^a$ and 62$^b$ toward the axis of the disk 35. As these rollers 62$^a$ 62$^b$ approach the axis of the disk the rotative velocity of the disk will of course be proportionately increased, and when the rollers 62$^a$ 62$^b$ shall have arrived at their innermost position the speed of rotation of the disk 35 will have reached its maximum. While the spring 38 normally affords means for holding the friction-disk 35 in the intermediate position shown between the rollers 62$^a$ and 62$^b$, as soon as the upper roller approaches the lower the hub 36 of the disk will slide downwardly on its axis of rotation, compressing the spring 38, as will be readily understood. The rotation of the driven shaft 5 is of course produced by the frictional contact between the rollers and the disk, the movement being transmitted through the gear-wheels 27 and 28. If the roller 62$^b$ is moved against the collar 11, the clutch referred to above is produced, and a positive connection then exists from the shaft 47 to the driven shaft 5. After a positive connection is made in this way the lever 66 will be moved, so as to throw the frictional transmission out of operation. From this arrangement it should now be evident that the friction transmission may be commenced and continually increased as desired, finally ending in a positive connection between the driving and driven shafts.

Having thus described my invention, I claim as new and desire to secure by Letters Patent—

1. In a transmission mechanism, in combination, a rotatable friction-disk, a shaft adapted to be driven therethrough, a second shaft in alinement with said first shaft, a friction-roller carried on said second shaft and engaging said disk to rotate the same, means for advancing said roller along its shaft, and a member carried by said first shaft and coöperating with said roller to constitute a clutch.

2. In a transmission mechanism, in combination, a rotatable friction-disk, a shaft adapted to be driven therethrough, a second shaft in alinement with said first shaft, a friction-roller carried on said second shaft and engaging said disk to rotate the same, means for advancing said roller along its shaft, a member carried by said first shaft and coöperating with said roller to constitute a clutch, and means for rotatably mounting said second shaft on said first shaft.

3. In a transmission mechanism, in combination, a pair of substantially parallel shafts, a friction-disk rotating in a plane therebetween, friction-rollers carried by said shafts and adapted to clamp said disk therebetween, a shaft in substantial alinement with one of said first shafts, means for advancing said rollers toward the axis of rotation of said disk, and an eccentric mounting for one of said first shafts affording means for moving said rollers toward each other.

4. In a transmission mechanism, in combination, a speed-shaft, a second speed-shaft disposed substantially parallel therewith, a friction-disk adapted to rotate in a plane between said shafts, a roller carried by said first shaft, a second roller carried by said second shaft and coöperating with said first roller to clamp said disk therebetween, means for advancing said first roller, a driven shaft, means for driving said shaft through said disk, and a positive clutch connection between said first shaft and said driven shaft, said first roller affording means for closing said clutch.

5. In a transmission mechanism, in combination, a speed-shaft, a second shaft substantially parallel with said first shaft, an eccentric mounting for said second shaft, a friction-disk mounted to rotate in a plane between said shafts, a roller carried by said first shaft and adapted to engage said disk, a second roller carried by said second shaft and adapted to engage said disk behind said first roller a driven shaft in alinement with said first shaft, means for driving said driven shaft through said friction-disk, a clutch member carried by said driven shaft, and means for advancing said first roller toward the axis of rotation of said disk, said first roller constituting a clutch member and coöperating with said first clutch member to connect said first shaft and said driven shaft positively.

6. In a transmission mechanism, in combination, a spindle, a friction-disk mounted to rotate and slide thereupon, a friction-roller adapted to engage the face of said disk, a second roller opposite said first roller, means for moving one of said rollers to clamp said disk against the opposite roller, a spring normally maintaining said disk out of engagement with said roller, a driven shaft, means for driving the same through said friction-disk, a clutch member carried by said driven shaft, and means for advancing said first roller toward said spindle, said first roller constituting a clutch member and coöperating with said first clutch member to positively connect said driven shaft therewith.

In testimony whereof I have signed my name to this specification in the presence of two subscribing witnesses.

EDWARD NELSON.

Witnesses:
 CHAS. A. BALL,
 HERMAN NIELSEN.